United States Patent [19]

Harte

[11] 3,902,255

[45] Sept. 2, 1975

[54] RAPID FEEDBACK TEST BOARD

[76] Inventor: James Richard Harte, 10 W. Concord, Kansas City, Mo. 64112

[22] Filed: Feb. 19, 1974

[21] Appl. No.: 443,703

Related U.S. Application Data

[63] Continuation-in-part of Ser. No. 368,092, June 8, 1973, abandoned.

[52] U.S. Cl. .................................. 35/9 R; 35/48 A
[51] Int. Cl. ............................................. G09b 3/08
[58] Field of Search ........... 35/48 R, 48 A, 9 R, 9 C

[56] References Cited
UNITED STATES PATENTS

| | | | |
|---|---|---|---|
| 1,644,160 | 10/1927 | Thompson | 35/48 A |
| 2,060,308 | 11/1936 | Harding | 35/48 A |
| 2,295,818 | 9/1942 | Wistar | 35/48 A |
| 3,139,688 | 7/1964 | Roop | 35/9 R |
| 3,177,595 | 4/1965 | Yonkers et al. | 35/48 R |
| 3,477,144 | 11/1969 | Stillit | 35/9 C |
| 3,520,074 | 7/1970 | Severin et al. | 35/48 R |
| 3,747,229 | 7/1973 | Harte | 35/9 R |
| 3,754,337 | 8/1973 | Harte | 35/9 R |

Primary Examiner—J. H. Wolfe
Attorney, Agent, or Firm—D. A. N. Chase

[57] ABSTRACT

A test board is disclosed which has a flat surface with a number of holes therein that provide a response feedback when a student, using a stylus, attempts to punch openings through answer zones on an instructional sheet overlying the surface. The test board is a plate member, preferably of unitary construction, formed with a pattern of upwardly projecting, tapered support components that presents the surface, such components defining the boundaries of a number of discrete, recessed areas representing possible answer selections. In the preferred embodiment, the support components comprise a lattice of intersecting ridges. Correct answer selections are represented by deep holes provided by those areas in communication with pronounced cavities in the member, whereas incorrect selections are represented by other areas defined by shallow recesses. Each of the ridges of the lattice (preferably a uniform grid) has a peak and a pair of ramps on opposite sides of the peak for guiding the stylus into the recessed area bounded by a particular ramp at the point at which it is engaged by the stylus. This eliminates nonresponse space which would otherwise be present. Although preferably opaque, the plate member may be composed of a translucent material having sufficiently uniform light-transmitting properties to prevent visual differentiation between the shallow and deep holes when covered by the overlying instructional sheet. Special gripping devices at the corners of the plate member hold the sheet in place as the stylus is punched through the zones and withdrawn, and an integral peripheral flange arrangement on the member provides clearance for the devices when it is desired to stack a number of the test boards on top of one another for storage purposes. An alternative form of the invention utilizes a special stylus for indicating the correctness of the selected answers, in contrast to feedback primarily obtained from observing the presence or absence of punched openings, or the shape thereof, in the instructional sheet.

14 Claims, 22 Drawing Figures

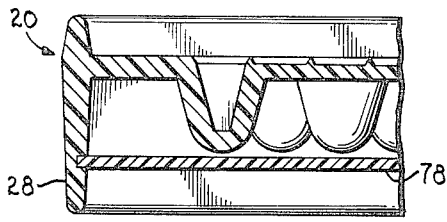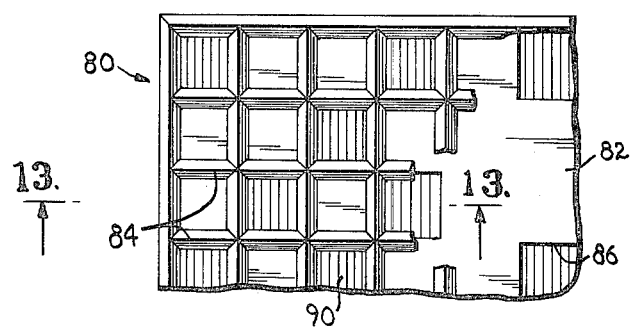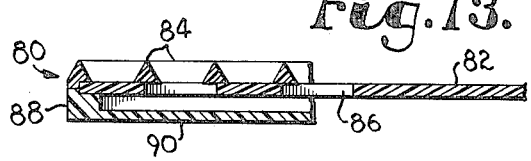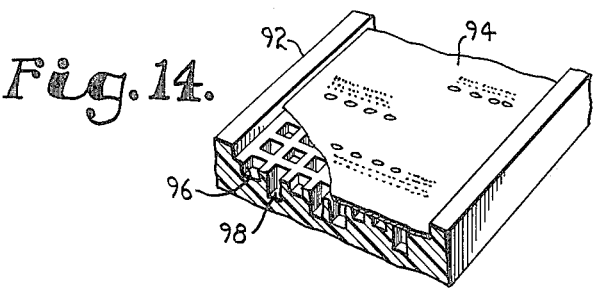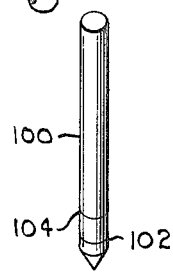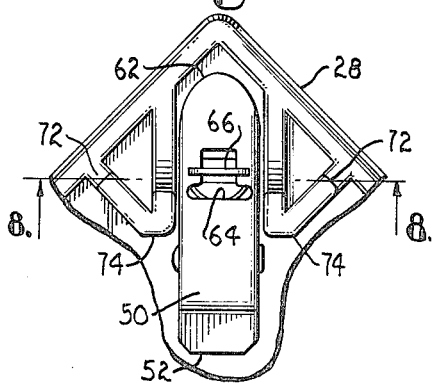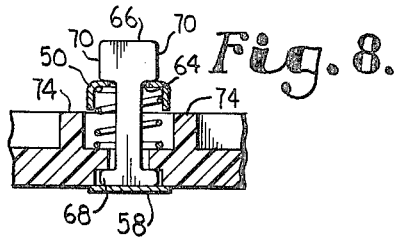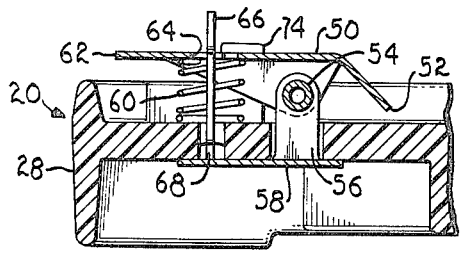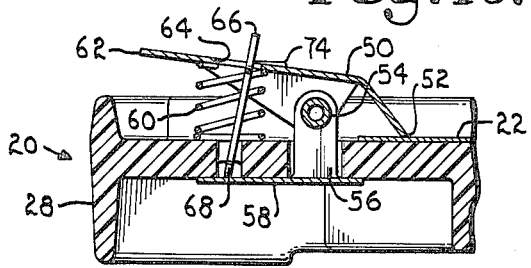

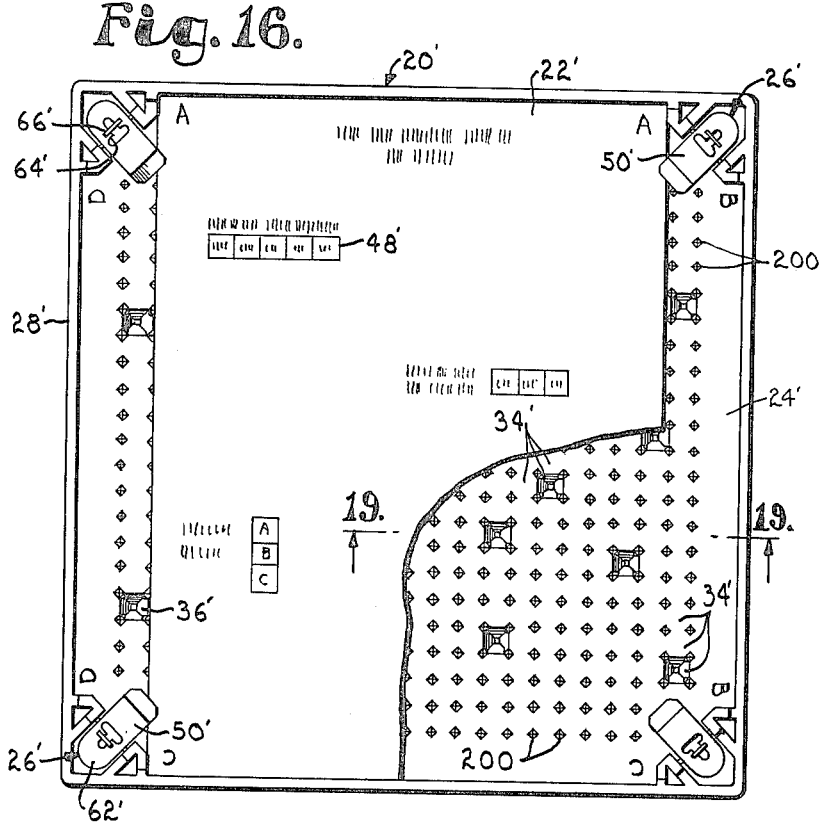
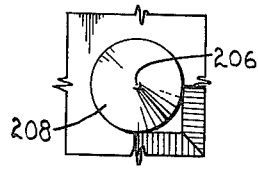
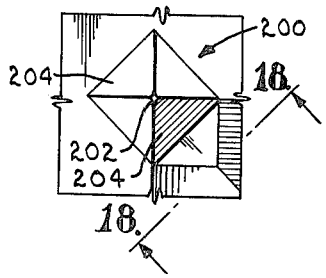
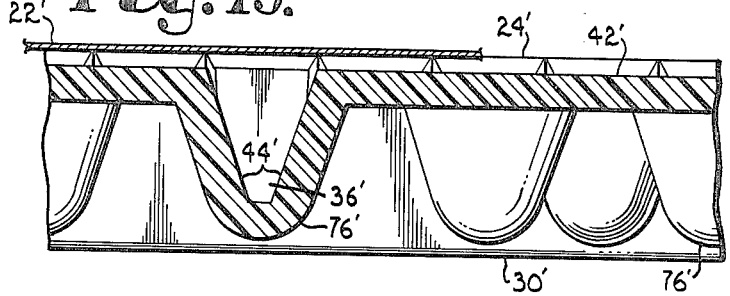
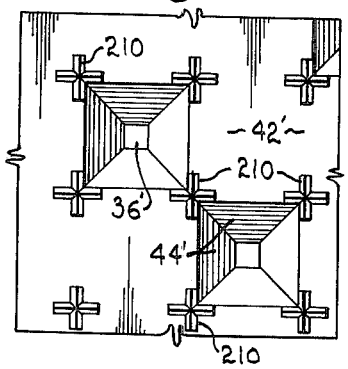
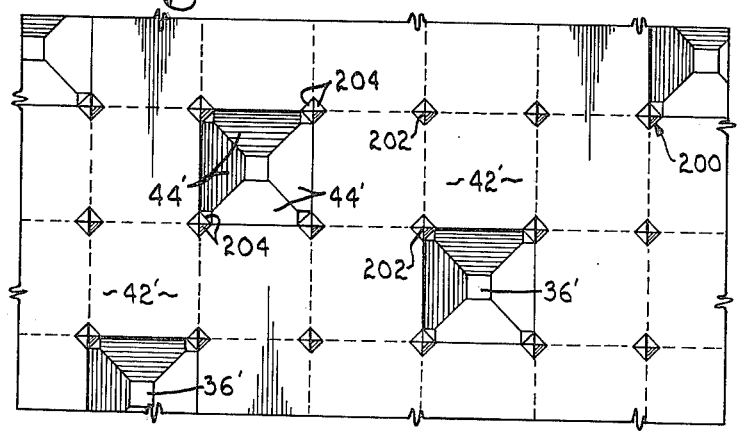
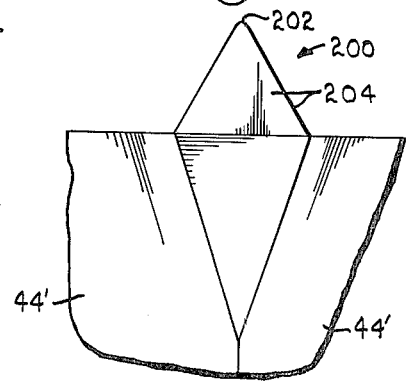

RAPID FEEDBACK TEST BOARD

CROSS-REFERENCE

This is a continuation in part of my copending application, Ser. No. 368,092, filed June 8, 1973, now abandoned.

This invention relates to improvements in test boards of the type where a student receives instantaneous feedback as to the correctness of selected answers.

My U.S. Pat. Nos. 3,747,229 and 3,754,337 are directed to manually operated self-instructional and self-testing apparatus utilizing a test board having a flat surface containing holes that may differ in size, shape or depth (or a combination of these variables) in order to give a rapid response feedback when an answer is selected on an instructional sheet by punching an opening through the selected answer zone. However, the construction of such boards inherently produces a significant amount of nonresponse space which, in a grid, is the dead area in a given square that represents neither a correct answer nor an incorrect answer. For structural integrity, an entire square cannot be formed as a hole for receiving the stylus since there must be a wall of at least a certain minimum thickness between that hole and a hole in an adjacent square. For example, assuming a grid in which each square is four-tenths of an inch on a side, a practical limit is a hole five-sixteenths inch at the maximum transverse dimension (diameter in the case of a circular hole). In the special case where square holes exclusively are employed, it is still required in practice that an internal wall thickness on the order of one-tenth of an inch be left between adjacent holes of the grid.

I have calculated that from approximately thirty percent to 50 percent of the space or working area of prior art test boards comprises nonresponse space in those regions of the board where holes are present to provide a response feedback. This requires that the stylus be accurately placed by the student and can, therefore, be misleading in some instances. The problem is particularly enhanced by the fact that the instructional sheet overlying the surface of the board may not be in perfect register, thus the answer zones on the sheet would not be accurately aligned with the grid. In an aggravated case this can severely mislead the student, who may think that he has made an answer selection which is incorrect and may pass on to the next question, not realizing that a slight movement of the stylus toward the limits of the answer zone would have resulted in penetration through the paper and, therefore, an entirely different response.

It is, therefore, an important object of the present invention to provide a test board of the type discussed wherein the problem of nonresponse space is virtually eliminated.

As a corollary to the foregoing object, it is an important aim of this invention to provide a board as aforesaid having a pattern of upwardly projecting, tapered support components that receives the instructional sheet and defines the various response areas of the board, wherein such components have ramps that guide the stylus into a particular area beneath the selected zone to provide a positive feedback.

Another important object of the invention is to provide a board as aforesaid having deep cavities therein representing answer selections of a given type, wherein such cavities communicate with certain of said response areas, and wherein the mouth of each cavity is in register with the entire area with which the cavity communicates in order that the stylus, when guided into such area, must penetrate into the deep cavity and provide a positive feedback.

Still another important object of the invention is to provide a board as aforesaid wherein the support components comprise a lattice of intersecting ridges, a segmented lattice, or projections of conical or pyramidal configuration in which the peaks and ramps thus defined function to guide the stylus in a manner to eliminate nonresponse space.

Furthermore, besides the elimination of nonresponse space, it is an important object of the present invention to provide an improved means of gripping the instructional sheet on the surface of the board to prevent movement of the sheet as the stylus penetrates a selected zone and is withdrawn.

Another important object of this invention is to provide a test board with gripping means as aforesaid, wherein the board has a special configuration providing clearance for the gripping devices that permits a number of boards to be stacked in a stable configuration on top of one another for storage convenience.

Still further, other important objectives of the present invention are to provide a test board arrangement where the response feedback is accomplished by the stylus rather than the punched openings; to provide a translucent test board that prevents visual differentiation between the holes in the surface of the board when the instruction sheet is positioned on the surface, even though the student may hold the board up to a light in an attempt to cheat; and to provide another alternative approach to prevent the student from anticipating the correct answer through the use of an opaque bottom member underlying a unitary, imperforate plate member that presents the test board surface.

In the drawings:

FIG. 7 is an enlarged, plan view of one of the corners of the test board illustrated in FIG. 1, showing the paper gripping device in greater detail;

FIG. 8 is a vertical-sectional view taken along line 8—8 of FIG. 7;

FIG. 9 is a vertical-sectional view of the device of FIG. 7, taken along the longitudinal center line of the holddown lever;

FIG. 10 is a view similar to FIG. 9 with the locking dog now being shown in its unlocked position releasing the lever for engagement of its gripping end with the paper;

FIG. 11 is a fragmentary, vertical-sectional view of a modified form of test board employing an opaque bottom member;

FIG. 12 is a fragmentary, plan view of another modified form of test board employing a removable plate element, a portion of the lattice being broken away from clarity;

FIG. 13 is a fragmentary, vertical-sectional view of the test board of FIG. 12, taken along line 13—13 of FIG. 12;

FIG. 14 is a fragmentary, cross-sectional and perspective view of another type of test board employing holes of the same cross-sectional size and shape and of significant, but different depths;

FIG. 15 is a perspective view on an enlarged scale of a stylus for use with the board of FIG. 14;

FIG. 16 is a plan view of an alternative to the embodiment of FIG. 1, showing the instructional sheet in place on the board and partially broken away to reveal the underlying pattern of upwardly projecting support components;

FIG. 17 is a plan, detail view of one of the components shown in FIG. 16, revealing the four-sided pyramidal configuration;

FIG. 18 is an enlarged, fragmentary cross-section taken along line 18—18 of FIG. 17;

FIG. 19 is an enlarged, fragmentary, vertical-sectional view taken along line 19—19 of FIG. 16;

FIG. 20 is an enlarged, fragmentary, plan view of a portion of the board of FIG. 16;

FIG. 21 is a detail view similar to FIG. 17, but showing a second form of support component of conical configuration; and FIG. 22 is an enlarged plan view similar to FIG. 20, but showing a third form of the support components comprising a segmented lattice of intersection ridges.

DESCRIPTION — FIGS. 1–15

Figure 1:
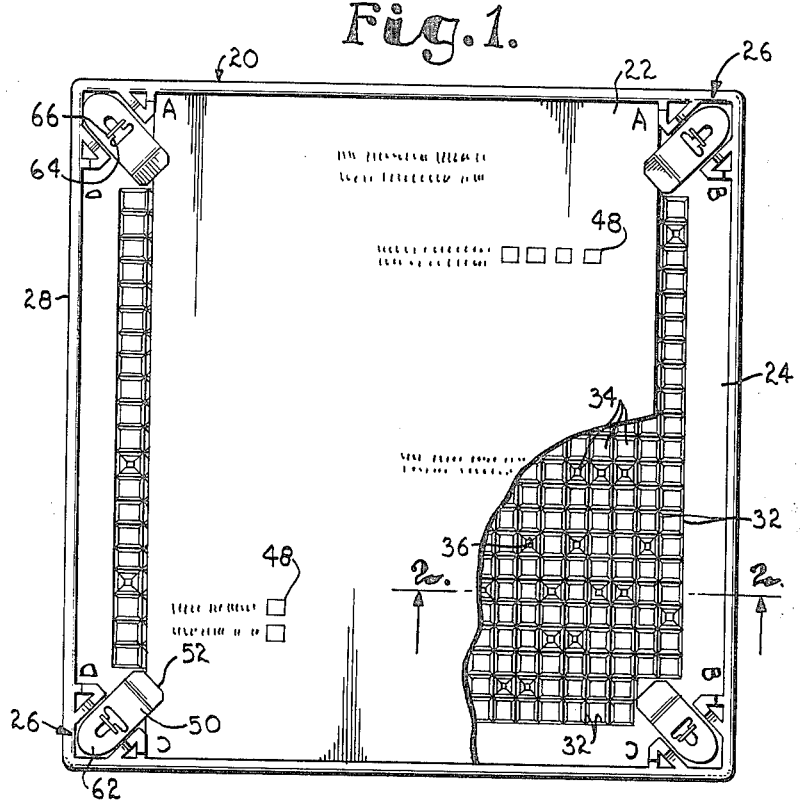
FIG. 1 is a plan view of the preferred embodiment of the test board of the present invention, showing the instructional sheet in place thereon and partially broken away to reveal the underlying lattice whose components support the sheet.

Referring initially to FIGS. 1–5, the preferred test board of the present invention comprises a unitary, monolithic plate member 20 of square configuration as is clear in FIG. 1. A rectangular instructional sheet 22 overlies the flat, upper surface 24 of member 20 and may be placed on the surface 24 in any one of four orientations as illustrated by the letters A—A, B—B, C—C and D—D. The sheet 22 illustrated is to be used in the A—A position, thus the two A's at the upper corners of the sheet 22 overlie the A designations (concealed) at the upper edge of the surface 24 as viewed in FIG. 1. Four paper gripping devices 26 at the four corners of the plate member 20 hold the paper sheet 22 in place without interfering with the information thereon, as will be discussed in detail hereinafter.

The plate member 20 is preferably of unitary, plastic construction formed by injection molding. A continuous, peripheral flange 28 enables the member 20 to be placed in a stable position on an underlying supporting surface such as a table or desk (not shown), with the lower edge 30 of the flange 28 in engagement with the supporting surface.

Figure 2:
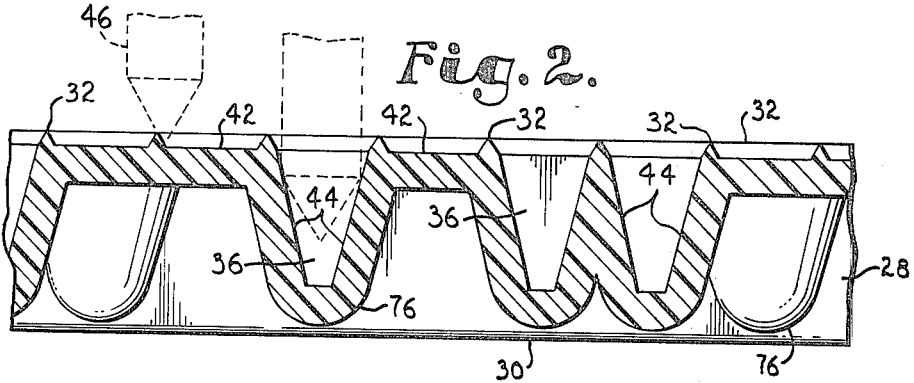
FIG. 2 is an enlarged, fragmentary, vertical-sectional view taken along line 2—2 of FIG. 1 with the instructional sheet removed, a stylus being shown in phantom lines.

In the present invention, possible answer selections are represented by holes in a uniform grid, such grid being in the nature of a lattice of intersecting ridges 32 as may be seen comparing FIG. 1 and FIG. 2. The orthogonally intersecting ridges 32 define the boundaries of a number of discrete, contiguous, recessed areas 34, some of which communicate with relative deep cavities 36 as is most apparent in FIG. 2. Accordingly, the holes in the surface 24 are shallow or deep depending upon the locations of the cavities 36, which correspond to correct answer selections. Note in this respect that the various ridges 32 present the major portion of the surface 24 and support the sheet 22, the peaks of the ridges being in a common plane with the marginal portions of the surface 24 adjacent the peripheral flange 28.

Figure 4:
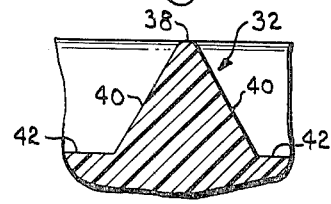
FIG. 4 is a greatly enlarged, fragmentary, cross-sectional view in the same plane as FIG. 2, showing the ridge configuration on a magnified scale.

With specific reference to FIG. 4, the ridge 32 there illustrated in cross section has a sharp peak 38 and a ramp 40 on each side of the peak 38. Each of the ramps 40 forms an angle of approximately 60° with the plane of the surface 24, the peaks 38 of all the ridges 32 lying in such plane as mentioned above. In the shallow recesses where the cavities 36 are not provided, the plate member 20 presents a base 42 at the bottom of each such recess where the ramps 40 of the surrounding ridge segments 32 terminate.

In those areas of the grid where the bases 42 are replaced by cavities 36, the holes thus formed have a different configuration besides the substantially increased depth. As clearly shown in FIG. 2, the four internal wall surfaces 44 of the plate member 20 defining each cavity 36 (the latter have a square cross section) form a substantially sharper angle with the common plane of the bases 42. The angle formed by each surface 44 and such plane is approximately 75° in contrast to the 60° angle for the ramps 40 discussed above. As is evident, the planes of the surface 24 and the bases 42 are parallel and closely spaced so that the recesses formed by the grid are quite shallow as compared with the correct answer holes formed at the cavities 36.

Figure 5:
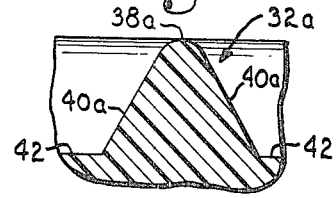
FIG. 5 is a view similar to FIG. 4 but showing the configuration of the modified ridge of FIG. 3 on a magnified scale.
Figure 3:
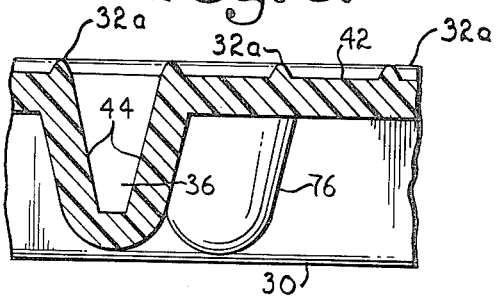
FIG. 3 is a fragmentary view similar to FIG. 2, but showing a modified ridge configuration.

FIGS. 3 and 5 illustrate a modified ridge configuration, each of the ridges 32a having a rounded peak 38a flanked by ramps 40a. The ridges 32a with the more rounded peaks 38a are nearly as effective in eliminating nonresponse space (to be discussed) and in some instances may provide greater comfort in handling the test boards due to the blunter peaks. When it is considered that FIGS. 4 and 5 are greatly magnified views (a representative length for the sides of each square of the grid is three-eighths inch), then it may be appreciated that the peaks 38 can be made uncomfortably sharp to the touch. Through the use of the greater angle for the internal wall surfaces 44 defining the cavities 36, the size of the squares of the grid is minimized while still providing cavities that are pronounced and deep without also using this same, greater angle for the ramps 40.

A stylus 46 is illustrated in phantom lines in FIG. 2 in two representative positions. The lefthand illustration shows the point of the stylus engaging the second ridge 32 from the left seen in cross section, and represents a stylus as might be used by a student at the time just after initial contact with the instructional sheet 22 (not shown). A variety of pointed instruments may be used for the stylus 46, such as a pencil or ball point pen. The only limitations on the stylus configuration is that it should have a relatively sharp point and a sufficiently small diameter that it will be received deeply within any of the cavities 36 should the student punch through the answer sheet 22 at these locations, as also illustrated in FIG. 2. In this connection, it should be noted in FIG.

1 that the sheet 22 is provided with a number of zones 48 for indicating selected answers, each of the zones 48 being in alignment with an underlying square area 34.

The paper gripping devices 26 are best illustrated in FIGS. 6-10. Each of the devices 26 is identical in construction, and includes a hold-down lever 50 having a pointed end 52 for engaging and gripping the paper sheet 22. The end 52 may be formed with several teeth if desired. The lever 50 is pivotally mounted intermediate its ends by a pivot pin 54 carried by a pair of ears 56 projecting upwardly from a retaining strip 58. The ears 56 extend through clearance openings in a peripheral, platform portion of the plate member 20 adjacent the peripheral flange 28, located outside of the lattice structure of the plate member.

A coil spring 60 is disposed between the pivot pin 54 and the outer end 62 of the lever 50, and underlies a T-shaped slot 64 in the lever 50. A locking dog 66 extends through the spring 60 and the slot 64, the lower, T-shaped end 68 of the dog 66 being received within a recess in the underside of the platform portion of the plate member 20. The lower end 68 overlies the retaining strip 58, thus the dog 66 cannot be withdrawn vertically but is permitted limited lateral movement within the confines of the spring 60 as seen by a comparison of FIGS. 9 and 10.

The upper end portion of the dog 66 presents a pair of opposed lugs 70 that engage the lever 50 at the edges of the slot 64 when the lever 50 is latched as illustrated in FIGS. 1 and 6-9. This is the locking position of the dog 66, where it remains until manually advanced a short distance toward the pointed end 52 to align the lugs 70 with the wider portion of the T-shaped slot 64. This is illustrated in FIG. 10 where the dog 66 is shown in an unlocked position releasing the lever 50 for movement of its end 52 into gripping engagement with the paper 22 under the action of the spring 60. The dog 66 also forms a guide for the coil spring 60, only a short throw of the dog being required to release the hold-down lever 50.

Figure 6:
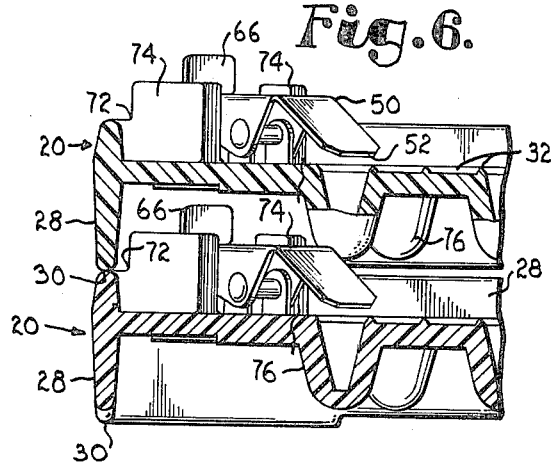
FIG. 6 is a fragmentary, vertical-sectional view of two of the test boards stacked one on top of the other, and illustrating the clearance provided for the paper gripping devices.

Although the four gripping devices 26 necessarily project upwardly from the flat upper surface 24 of the plate member 20, a number of the members 20 may be stacked one on top of the other as illustrated in FIG. 6 for convenience in storing. This is facilitated by the peripheral flange 28 which provides clearance for the devices on the plate member 20 directly therebeneath. In this connection it should be noted that the flange 28 extends both above and below the plane of the surface 24, and that notches 72 in retaining abutments 74 for the devices 26 permit the lower edge 30 of the flange 28 to directly engage the upper edge of an underlying flange 28 as is clear in FIG. 6. The flange 28 extends downwardly from the plane of the surface 24 a sufficient distance to clear the protuberances or bulges 76 on the underside of the plate member 20 at the cavities 36 formed during the molding operation so that, besides permitting stacking, the flange 28 enables the test board to rest evenly and stably on a table or other supporting surface when in use.

An opaque plastic material is preferred for the plate member 20 of the present invention in order to prevent the student from holding the member (with the instruction sheet 22 in place) to the light to distinguish the deep holes representing correct answers, from the shallow holes that represent incorrect answers. Although the plate member 20 is of approximately constant thickness at both the bases 42 and the bulges 76, the irregular configuration would enable a student desiring to cheat to recognize the deep cavities 36 unless the plate material is opaque.

As an alternative, a clear, translucent plastic material may be selected having sufficient transparency to also prevent visual differentiation between the holes of different depths. Such a material with uniform light transmitting properties renders the lattice indistinguishable through the thickness of the overlying paper sheet 22.

Another alternative is illustrated in FIG. 11, where it may be seen that a bottom member 78 in the form of a flat, thin plate is mounted beneath the lattice structure of the plate member 20 and secured at its edges to the peripheral flange 28. The bottom member 78 may be any opaque material or may be coated with an opaque paint to positively preclude exposure of the underside of the lattice structure to light. This provides complete flexibility in the choice of materials for the plate member 20 without regard to the opaqueness (or transparency) thereof.

A modified form of the invention is illustrated conceptually in FIGS. 12 and 13. The test board 80 is a two-piece member that includes a removable plate element 82 underlying a lattice formed by a uniform grid of intersecting ribs or ridges 84. The principle is the same as in the embodiment of the invention illustrated in FIGS. 1-6, except that the deep cavities are formed by square apertures 86 in the plate element 82 that register with certain of the recessed areas defined by the ridges 84. The grid structure is supported on a peripheral sidewall 88 integral with a bottom member 90. Thus, each of the apertures 86 in the removable plate element 82 forms a deep cavity in the grid structure due to the vertical space between the bottom member 90 and the plate element 82 provided by the sidewall 88, as is clear in FIG. 13. By providing a number of removable plate elements 82, the pattern of the correct answer selections can be changed at will as might be desired by an instructor.

FIGS. 14 and 15 are directed to an embodiment of the invention wherein the response feedback is via the stylus exclusively rather than the presence or absence of punched openings in the instruction sheet, or the shape or size of such openings. The test board is illustrated conceptually in FIG. 14 and comprises a solid, unitary plate member 92 having a flat upper surface upon which the instruction sheet 94 is placed. Holes 96 and 98 in the upper surface of the member 92 are shallow and deep, respectively, but each of the holes has a square cross-sectional configuration of the same size. This test configuration is used in conjunction with a special stylus 100 illustrated in FIG. 15, the stylus 100 having a pair of longitudinally spaced marks 102 and 104 thereon adjacent its pointed tip. The mark 102 is closest to the tip and corresponds to the depth of penetration of the stylus 100 when it is punched through the paper sheet 94 into one of the shallow holes 96. However, when the stylus 100 is punched through the sheet 94 into one of the deeper holes 98, then the stylus is received to the upper mark 104.

If desired, the segments of the stylus 100 between mark 102 and the tip, and between the marks 102 and 104 may be of different colors or different textures to enhance the visual feedback or provide a response feedback by feel. Accordingly, the student is instantly aware of whether the answer he has selected is correct or incorrect due to the response feedback provided by the stylus 100 that enables the student to positively differentiate between different depths of penetration. In the event that other holes of intermediate depth (not shown) are employed to represent a partially correct answer, the stylus 100 would then be modified to provide three distinct feedback segments rather than two.

DESCRIPTION — FIGS. 16-22

The embodiment of FIGS. 16-22 is identical to the preferred test board illustrated in FIGS. 1-5, except for the nature of the support components underlying the instructional sheet. Accordingly, the same reference numerals are used where appropriate with the addition of the prime notation.

In FIG. 16 it may be seen that a uniform grid is defined by a pattern of upwardly projecting, tapered support components 200, each such component 200 being located at a corresponding intersection of imaginary lines forming the grid configuration. Therefore, the components 200 are at the corners of the recessed areas 34', and the boundaries of the areas 34' are defined by the components 200 and these imaginary lines interconnecting the components 200 in the grid pattern.

As may be seen in FIG. 19, the peaks of the components 200 are in a common plane with the marginal portions of the surface 24' adjacent the peripheral flange 28'. FIG. 17 clearly reveals that each component 200 is a four-sided, regular pyramid having a relatively sharp peak 202 and four diverging ramps 204 formed by the sides of the pyramid.

Referring to FIG. 20, the enlarged plan view of this figure shows that each component 200 is oriented so that its four ramps 204 face the four square response areas defined by a common corner, the component 200 being located at such corner. Accordingly, each ramp 204 faces one particular area exclusively and, as the enlargement of FIG. 20 more clearly reveals, the imaginary lines (shown as broken lines) of the uniform grid interconnect the peaks 202 of the various components 200.

In FIG. 21 a second form of support component is illustrated, and comprises a conical projection having a relatively sharp peak 206 and a continuous ramp 208 formed by the side wall of the cone diverging from the peak 206. The conical component would be substituted for the pyramidal components 200 illustrated in FIGS. 16-20, with the cones being centered at the respective grid intersections. Accordingly, the pattern of broken lines illustrated in FIG. 20 would intersect the peaks 206 with the conical components substituted.

FIG. 22 illustrates a third form of support component 210 in the nature of spaced segments of a lattice of intersecting ridges. The ridge components 210 are similar to the intersecting ridges 32 of the embodiment of FIGS. 1-5, except that the ridges do not completely span each adjacent pair of intersections thereby leaving a segmented lattice arrangement as seen in FIG. 22. The configuration of the ridge peaks and ramps for the segments is the same as in FIGS. 1-5.

OPERATION

The same principles of instruction and testing apply in the present invention as in the apparatus disclosed in my prior patents identified above. Referring to FIGS. 1-5, the instructional sheet 22 is placed on the surface 24 in the proper position, thereby aligning the answer zones 48 with the underlying grid. For example, the sheet 22 may have multiple choice questions thereon where there is only one correct answer to each question. Zones 48 representing incorrect answers are aligned with the shallow recesses presented by underlying bases 42, whereas the zones 48 representing correct answers are aligned with corresponding cavities 36.

With the instructional sheet 22 properly positioned, the dogs 66 of the gripping devices 26 are manually advanced toward the large end of each of the slots 64 to release the holddown levers 50 for movement to the position illustrated in FIG. 10. The short throw of the dog 66 of each of the devices 26 enables the student to quickly actuate the devices to hold the paper firmly in place. Releasing the paper after testing is also readily accomplished by depressing the outer ends 62 of the levers 50 and moving the dogs 66 back in the slots 64, as illustrated in FIGS. 1 and 7-9. The devices 26 at all times provide free access without obstruction to the entire upper face portion of the sheet 22 containing the zones 48.

Since at least a shallow depression exists in all of the squares of the grid by virtue of the intersecting ridges 32, the student cannot anticipate the correct answer by feeling the surface of the sheet 22. The correctness of the answer will only be ascertained when the student attempts to pentrate the selected zone 48 with the stylus 46. If the answer is incorrect, then only a mark or small hole will be made in the zone 48; however, if the answer is correct a large hole will be punched as the stylus enters the cavity 36.

The elimination of nonresponse space may best be appreciated from viewing FIG. 2 and noting the representative position of the stylus 46 illustrated with its tip engaging one of the ridges 32. Since the ramps 40 or 40a (FIGS. 4 and 5) of the ridges 32 or 32a are steeply inclined, a ramp upon engagement by the tip of the stylus 46 will guide the stylus into the adjacent recessed area, either a shallow recess or a deep hole if a cavity 36 is there. Should the tip of the stylus 46 strike the peak 38 of a ridge 32, the pressure applied by the student will ultimately force the stylus 46 one way or the other down one of the ramps 40 and thus cause a definite selection to be made.

Accordingly, the penetration of the stylus 46 into the square area 34 of the grid underlying a selected zone 48 will always result in a response feedback to the student since the penetration will either be shallow or deep, and both are meaningful. Besides feeling the marked difference in the penetration, the presence of the larger punched openings in the sheet 22 for correct answers reinforces the response and provides a permanent record. Although only two hole depths (correct or incorrect) are illustrated, intermediate hole depths may also be employed if desired in order to indicate partially correct answers, as discussed hereinabove with respect to the embodiment of FIGS. 14 and 15.

Referring to FIGS. 16-22, the operation of this embodiment of the present invention is quite similar to that as discussed above with respect to FIGS. 1-5 and 7-10. The elimination of nonresponse space is best seen viewing FIGS. 16 and 20. Should the tip of the stylus initially engage one of the components 200, the tip is forced down along one of the ramps 204 into the corresponding recessed response area 34'. If a cavity 36' is present, then the stylus will penetrate deeply and punch a large opening in the sheet 22'. It should be noted that, as in FIGS. 1–5, the mouth of each cavity 36' is in register with the entire response area with which the cavity communicates; therefore, the tip of the stylus must come to rest either on one of the flat bases 42' or penetrate into one of the cavities 36', due to the action of the ramps 204 just discussed and the presence of the steeply inclined internal wall surfaces 44' that have their upper edges located in the common plane of the bases 42' at the boundaries formed by the imaginary lines of the grid.

The same principle of guiding the tip of the stylus positively into a particular response area applies to the modification in the support component configuration illustrated in FIGS. 21 and 22. Both alternative forms, by the ramps they present, cause the tip of the stylus to be guided down to the common plane of the bases 42', and thence on into one of the deep cavities 36' if such cavity is present beneath the selected zone 48' on the instructional sheet 22'.

Having thus described the invention, what is claimed as new and desired to be secured by Letters Patent is:

1. Educational apparatus comprising:
   an instructional sheet having a normally upper face provided with zones thereon for indicating answers selected in response to questions;
   a plate member provided with a flat surface for receiving said sheet, and having a pattern of upwardly projecting, tapered support components presenting at least a portion of said surface and defining the boundaries of a number of discrete, contiguous, recessed areas representing possible answer selections,
   said member having relatively deep cavities therein communicating with certain of said areas to represent answer selections of a given type, each cavity having a mouth in register with the entire area with which the cavity communicates;
   means on said member for holding said sheet in overlying relationship with said surface supported on said components in a predetermined position where said zones are aligned with corresponding areas in accordance with the answers represented by said zones,
   said holding means engaging said sheet at locations out of interfering relationship with said zones and being arranged to provide free access without obstruction to the entire upper face portion of said sheet containing said zones; and
   a stylus for punching through selected zones into the cavities beneath those zones that correspond to answers of said type, whereby penetration of the stylus provides a response feedback,
   each of said components having a peak and ramp means diverging from said peak for guiding the stylus into the recessed area bounded by a particular component at the point at which it is engaged by the stylus, whereby to eliminate nonresponse space.

2. The apparatus as claimed in claim 1, wherein said pattern defines a uniform grid in which said areas are of the same size.

3. The apparatus as claimed in claim 1, wherein said member presents a base at each of said areas other than said certain areas, said bases defining the bottom of the respective recessed areas from which said components project.

4. The apparatus as claimed in claim 3, wherein said bases lie in a plane parallel to and closely spaced from the plane of said surface to provide shallow recesses therein presented by said bases.

5. The apparatus as claimed in claim 1, wherein said components comprise a lattice of intersecting ridges, each of said ridges presenting said peak and having a pair of ramps on opposite sides of said peak presenting said ramp means.

6. The apparatus as claimed in claim 5, wherein said lattice is uniform, whereby said areas are of the same size.

7. The apparatus as claimed in claim 5, wherein said member presents a base at each of said areas other than said certain areas, said bases defining the bottoms of the respective recessed areas from which said ridges project and lying in a plane parallel to and closely spaced from the plane of said surface to provide shallow recesses therein presented by said bases.

8. The apparatus as claimed in claim 7, wherein the opposed ramps of each of said ridges form a predetermined angle with the plane of said surface, and wherein said member has internal wall surfaces defining said cavities and forming an angle with the plane of said bases substantially greater than said predetermined angle.

9. The apparatus as claimed in claim 5, wherein said member includes a removable plate element underlying said lattice and having apertures therein registering with said certain areas to provide said cavities.

10. The apparatus as claimed in claim 1, wherein said components are spaced apart along said boundaries and each is of conical configuration, presenting said peak and said ramp means.

11. The apparatus as claimed in claim 1, wherein said components are spaced apart along said boundaries and each is of pyramidal configuration and has a plurality of sides presenting said ramp means, each side being disposed to guide the stylus exclusively into one particular recessed area.

12. The apparatus as claimed in claim 1, wherein said components are spaced apart and comprise a segmented lattice of intersecting ridges, each of said ridges presenting said peak and having a pair of ramps on opposite sides of said peak presenting said ramp means.

13. The apparatus as claimed in claim 1, wherein said holding means includes a plurality of hold-down devices on said surface for gripping said sheet, and wherein said member has a peripheral flange adapted for engagement with an underlying supporting surface and providing clearance for said devices when stacking a plurality of said members on top of one another.

14. The apparatus as claimed in claim 1, wherein said holding means includes a device for gripping said sheet, said device including a hold-down lever having a pair of opposed ends, one of said ends being engageable with said sheet, pivot means intermediate the ends of said lever and mounting the latter adjacent said surface, a coil spring between said pivot means and the other of said ends of the lever biasing said one end thereof toward said surface, and a shiftable locking dog for said lever extending through said spring to provide a guide therefor, said dog having a short throw within said spring between a locking position engaging said lever and an unlocked position releasing the lever for movement of said one end thereof into engagement with said sheet under the action of said spring.

* * * * *